United States Patent
Monsowitz et al.

(10) Patent No.: US 10,540,693 B1
(45) Date of Patent: Jan. 21, 2020

(54) ADVERTISEMENTS RESPONSIVE TO COUPON STATES

(75) Inventors: Eric S. Monsowitz, Seattle, WA (US); Michal Jonathan Geller, Seattle, WA (US); Brandon R. I. Chang, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1537 days.

(21) Appl. No.: 13/589,382

(22) Filed: Aug. 20, 2012

(51) Int. Cl.
*G06Q 30/00* (2012.01)
*G06Q 30/02* (2012.01)

(52) U.S. Cl.
CPC .................. *G06Q 30/0269* (2013.01)

(58) Field of Classification Search
None
See application file for complete search history.

(56) References Cited

U.S. PATENT DOCUMENTS

| | | | | |
|---|---|---|---|---|
| 5,970,469 | A * | 10/1999 | Scroggie et al. | 705/14.26 |
| 2002/0194067 | A1* | 12/2002 | Wechsler et al. | 705/14 |
| 2006/0235764 | A1* | 10/2006 | Bamborough et al. | 705/26 |
| 2008/0052169 | A1* | 2/2008 | O'Shea | G06Q 20/10 705/14.17 |
| 2008/0195460 | A1* | 8/2008 | Varghese | 705/10 |
| 2012/0136706 | A1 | 5/2012 | Chang et al. | |
| 2012/0136707 | A1 | 5/2012 | Chang et al. | |
| 2012/0136708 | A1 | 5/2012 | Chang et al. | |
| 2012/0136710 | A1 | 5/2012 | Chang et al. | |
| 2012/0136712 | A1 | 5/2012 | Chang et al. | |

OTHER PUBLICATIONS

U.S. Appl. No. 12/956,608 entitled "Digital Coupon System" and filed Nov. 30, 2010.
U.S. Appl. No. 12/956,638 entitled "Digital Coupon System" and filed Nov. 30, 2010.
U.S. Appl. No. 12/956,653 entitled "Digital Coupon System" and filed Nov. 30, 2010.
U.S. Appl. No. 12/956,658 entitled "Digital Coupon System" and filed Nov. 30, 2010.
U.S. Appl. No. 12/956,684 entitled "Digital Coupon System" and filed Nov. 30, 2010.
U.S. Appl. No. 13/276,821 entitled "Purchase Targeted Coupons" and filed Oct. 19, 2011.
U.S. Appl. No. 13/534,418 entitled "Systems and Methods for Interactive Advertising" and filed Jun. 27, 2012.

* cited by examiner

*Primary Examiner* — Michael W Schmucker
(74) *Attorney, Agent, or Firm* — Thomas | Horstemeyer, LLP

(57) ABSTRACT

Various embodiments provide advertising that is aware of coupon states and user states. An advertisement to be presented to a user is determined. One of multiple versions of the advertisement is generated based at least in part on a state associated with the user and/or a state associated with a digital coupon for an item. One or more of the versions present the digital coupon. Data encoding the generated version of the advertisement is sent to a client associated with the user.

29 Claims, 5 Drawing Sheets

ADVERTISEMENTS RESPONSIVE TO COUPON STATES

BACKGROUND

Advertisers may decide to reach potential customers through the use of coupons. Conventional coupons are often published in a newspaper or other publication and lack various features. Conventional coupons published in a publication may not be targeted at specific users a coupon issuer wishes to reach and often lack relevance to content with which they are published. Additionally, redemption may not be automated. Oftentimes, users also must physically clip and retain a physical copy of a conventional coupon in order to redeem the coupon with a retailer.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing advertisements that are dynamically generated based at least in part on coupon states. When marketers present digital coupons as advertisements, such coupons may be presented irrespective of factors relating to coupon state or user state, such as whether a particular user has redeemed the coupon, whether the coupon has expired, whether the particular user has previously purchased the item, and/or other factors. The static nature of advertisements with digital coupons may waste advertising expenses and valuable marketing opportunities on advertising for coupons that are already used, expired, irrelevant, or are otherwise not the best use of the marketing opportunity.

Figure 1:
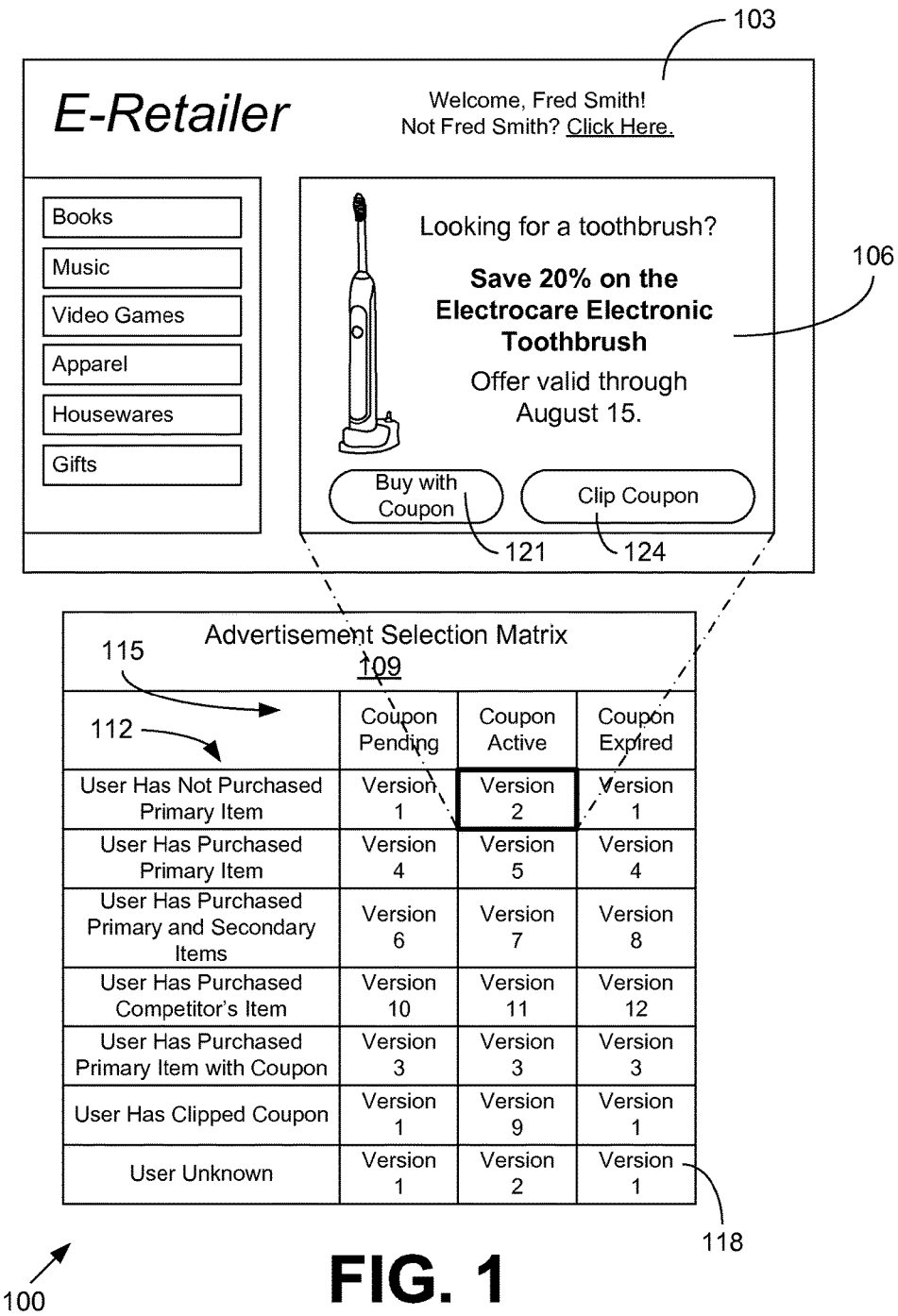
FIG. 1 is a drawing that illustrates a relationship between a user interface that includes an advertisement and an advertisement selection matrix according to various embodiments of the present disclosure.

Various embodiments of the present disclosure dynamically generate or select advertisements that may include a coupon based at least in part on a state associated with the coupon and/or a state associated with the user. To this end, different creative treatments for an advertisement may be selected according to coupon and/or user state. With reference to FIG. 1, shown is a drawing 100 that illustrates a relationship between a user interface 103 that includes an advertisement 106 and an advertisement selection matrix 109 according to various embodiments. The user interface 103, which may correspond to a network page, a mobile application screen, etc. is associated with an identified user (e.g., "Fred Smith"), who may or may not be authenticated.

The advertisement 106 that is to be included in the user interface 103 is first determined. Then, one of multiple versions (or creative treatments) of the advertisement 106 is generated based at least in part on user state and/or digital coupon state according to the advertisement selection matrix 109. The advertisement 106 may be dynamically generated or selected from stored versions of the advertisement 106. The advertisement selection matrix 109 may have a first dimension 112 corresponding to user state and a second dimension 115 corresponding to digital coupon state. Several non-limiting state examples are provided for each of the first dimension 112 and the second dimension 115. Each intersection of the first dimension 112 and the second dimension 115 responds to a respective condition 118.

The first dimension 112 shows user states that indicate whether the user has purchased a primary item featured in the advertisement 106, whether the user has purchased the primary item and another secondary item featured in the advertisement 106, whether the user has purchased an item of a competitor, whether the user has purchased the primary item with the digital coupon, whether the user has clipped the digital coupon, whether the user is unknown, and so on. The second dimension 115 shows coupon states that indicate whether the coupon is pending, whether the coupon is active, whether the coupon has expired, and so on.

In the non-limiting example of FIG. 1, the advertisement 106 corresponds to "version 2" of the advertisement 106, which corresponds to the condition 118 in the advertisement selection matrix 109 that indicates that the user has not purchased in the primary item and the digital coupon is currently active. The primary item in this case corresponds to an "Electrocare Electronic Toothbrush," and the advertisement 106 provides a digital coupon for 20% off the particular item. In some scenarios where a digital coupon is rendered, the advertisement 106 may include a buy with coupon control 121, a clip coupon control 124, or other controls. The buy with coupon control 121, when selected, may initiate a purchase of the item being advertised using the particular digital coupon featured in the advertisement 106. Similar controls may be employed to add the item to a shopping cart, wish list, gift list, etc. with the particular digital coupon. The clip coupon control 124 may be provided to enable a user to "clip" the digital coupon, thereby allowing the user to redeem the digital coupon for a future purchase.

The user state may be an important factor in selecting from the various versions of the advertisement 106. If the user had already purchased the particular item, a different version of the advertisement 106 may be selected to promote toothpaste, brush heads, or other accessories for the electronic toothbrush. Different digital coupon offers, for the same or a different item, may be provided in some cases. If a competing item has been purchased, the advertisement 106 may be tailored to encourage users to switch to the particular electronic toothbrush. If the digital coupon has been clipped by the user, an advertisement exhorting the user to use the coupon may be provided. If the digital coupon has been used by the user, another digital coupon relating to a secondary item such as an accessory may be provided.

The state of the coupon itself may also be significant. If the digital coupon is pending, a promotional advertisement 106 without a coupon may be provided. If the digital coupon has expired, a promotional advertisement 106 without a coupon may be provided.

Under some conditions 118, it may be the case that no version of an advertisement is specified. It is noted that different conditions 118 in the advertisement selection matrix 109 may be associated with different versions of the advertisement 106. However, the same version of an advertisement 106 may be selected under multiple conditions 118.

Various techniques relating to digital coupons are disclosed in U.S. patent application Ser. No. 12/956,608 entitled "DIGITAL COUPON SYSTEM" and filed on Nov. 30, 2010, U.S. patent application Ser. No. 12/956,638 entitled "DIGITAL COUPON SYSTEM" and filed on Nov. 30, 2010, U.S. patent application Ser. No. 12/956,653 entitled "DIGITAL COUPON SYSTEM" and filed on Nov. 30, 2010, U.S. patent application Ser. No. 12/956,658 entitled "DIGITAL COUPON SYSTEM" and filed on Nov. 30, 2010, U.S. patent application Ser. No. 12/956,684 entitled "DIGITAL COUPON SYSTEM" and filed on Nov. 30, 2010, U.S. patent application Ser. No. 13/276,821 entitled "PURCHASE TARGETED COUPONS" and filed on Oct. 19, 2011, and U.S. patent application Ser. No. 13/534,418 entitled "SYSTEMS AND METHODS FOR INTERACTIVE ADVERTISING" and filed on Jun. 27, 2012, all of which are incorporated herein by reference in their entirety. In the following discussion, a general description of the system and its components is provided, followed by a discussion of the operation of the same.

Figure 2:
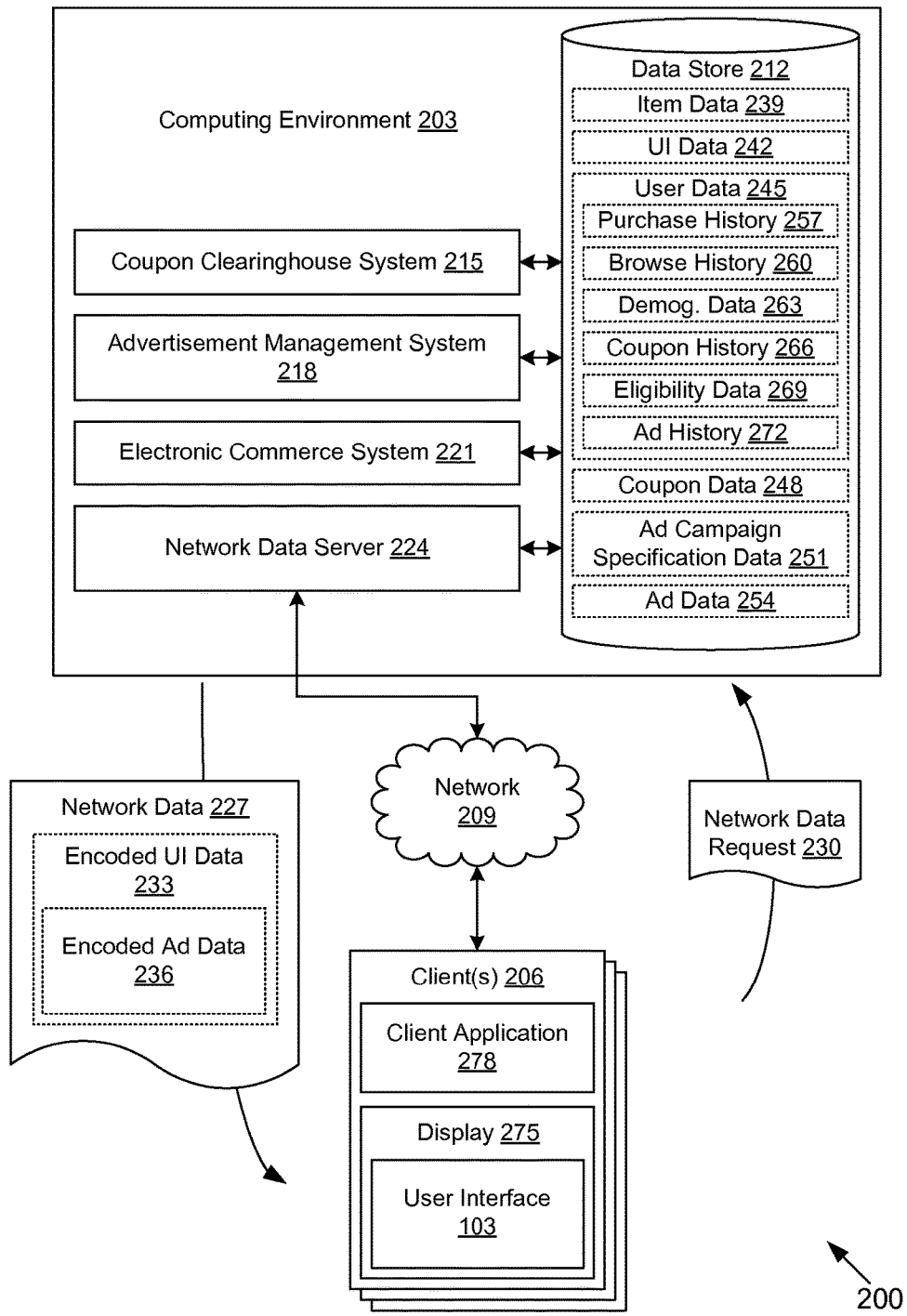
FIG. 2 is a drawing of a networked environment according to various embodiments of the present disclosure.

With reference to FIG. 2, shown is a networked environment 200 according to various embodiments. The networked environment 200 includes a computing environment 203 and one or more clients 206 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment may employ a plurality of computing devices that may be employed that are arranged, for example, in one or more server banks or computer banks or other arrangements. Such computing devices may be located in a single installation or may be distributed among many different geographical locations. For example, the computing environment 203 may include a plurality of computing devices that together may comprise a cloud computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a coupon clearinghouse system 215, an advertisement management system 218, an electronic commerce system 221, a network data server 224, and other applications, services, processes, systems, engines, or functionality not discussed in detail herein. The coupon clearinghouse system 215 is executed to facilitate distribution and redemption of digital coupons as will be described herein. The coupon clearinghouse system 215 can receive a coupon specification from a coupon issuer that defines the various properties and/or restrictions associated with a digital coupon funded by the coupon issuer. In turn, the coupon clearinghouse system 215 can make these digital coupons available to users by way of the advertisement management system 218.

Users may "clip" these coupons or associate the digital coupons with a user account. Users can then redeem these digital coupons with the electronic commerce system 221, a third party retailer, a point of sale system, and/or other retailer outlets, where the coupon clearinghouse system 215 facilitates authentication of the user, validation of the digital coupon, and encumbrance of the digital coupon. In this context, encumbrance of a digital coupon can refer to expiring the digital coupon or decrementing a number of uses available for the digital coupon. The coupon clearinghouse system 215 can also receive purchase confirmations and/or settlement requests from the electronic commerce system 221, third party retailer systems, point of sale systems, or other retail outlets in connection with purchases made by users for which a digital coupon issued by the coupon clearinghouse system 215 to the user was used.

Accordingly, the coupon clearinghouse system 215 can issue reimbursements to the electronic commerce system 221, third party retailer systems, point of sale systems, or other retail outlets and/or their operators for discounts or other promotions designated by the digital coupon. The coupon clearinghouse system 215 can also generate reporting metrics for a coupon issuer that includes various statistics and information regarding digital coupon redemption, the users that clip digital coupons, user purchasing history, user browsing history, etc. Additionally, the coupon clearinghouse system 215 can generate an invoice for a coupon issuer in connection with reimbursements paid to the electronic commerce system 221, third party retailer sites, and/or point of sale systems.

The advertisement management system 218 is executed to determine advertisements 106 (FIG. 1) to be presented to users within a user interface 103. Such a user interface 103 may correspond to a network page such as a web page, a mobile application screen, and/or other forms of user interfaces 103. The advertisement 106 may be associated with one or more digital coupons. The advertisement management system 218 may determine the advertisement 106 based at least in part on user behavior, user demographics, and/or other targeting data. Alternatively, the advertisement management system 218 may determine the advertisement 106 according to a rotation in a predefined sequence or a randomized sequence.

Once the advertisement management system 218 determines the advertisement 106, the advertisement management system 218 may be configured to select one of multiple versions of the advertisement 106 according to a state associated with the user and/or a state associated with a digital coupon. In one embodiment, the advertisement management system 218 employs an advertisement selection matrix 109 (FIG. 1) to select a version of the advertisement 106.

The electronic commerce system 221 is executed in order to facilitate the online purchase of items over the network 209. As used herein, the term "item" may refer to a product, good, service, software download, multimedia download, social networking profile, or any combination, bundle, or package thereof, that may be offered for sale, purchase, rental, lease, download, and/or any other form of consumption as may be appreciated. The electronic commerce system 221 also performs various backend functions associated with the online presence of a merchant in order to facilitate the online purchase of items. For example, the electronic commerce system 221 may generate user interfaces 103 or portions thereof that are provided to clients 206 for the purposes of selecting items for purchase, rental, download, lease, or other forms of consumption. The electronic commerce system 221 may be configured to perform recognition, identification, and authentication functions for users. In addition, the electronic commerce system 221 may be configured to request advertisements 106 from the advertisement management system 218 to be included in the user interfaces 103.

The network data server 224 is executed to serve up network data 227 to clients 206 over the network 209 in response to network data requests 230. The network data request 230 may include a uniform resource locator (URL), post data, query string data, item identifiers, user identifiers, session identifiers, and/or other data. The network data 227 may be generated by the advertisement management system 218, the electronic commerce system 221, and/or other systems. The network data 227 may include encoded user interface (UI) data 233, which may in turn include encoded advertisement data 236 and other data. In various embodiments, the network data server 224 may comprise a commercially available hypertext transfer protocol (HTTP) server such as, for example, Apache® HTTP Server, Apache® Tomcat®, Microsoft® Internet Information Services (IIS), and so on.

The data stored in the data store 212 includes, for example, item data 239, user interface data 242, user data 245, coupon data 248, advertisement campaign specification data 251, advertisement data 254, and potentially other data. The item data 239 may include various data relating to items offered through or otherwise known to the electronic commerce system 221, the advertisement management system 218, and the coupon clearinghouse system 215. The item data 239 may include, for example, titles, descriptions, quantities, conditions, dimensions, images, options, weights, customer reviews, customer ratings, keywords, shipping restrictions, prices, tax classifications, unique identifiers, and any other data related to items.

The user interface data 242 includes data that may be used by the electronic commerce system 221 or other systems in generating user interfaces 103. Such user interface data 242 may include hypertext markup language (HTML), extensible markup language (XML), cascading style sheets (CSS), extensible style sheet language transformations (XSLT), text, graphics, templates, audio, video, animations, and/or other data that may be used in generating user interfaces 103.

The user data 245 includes various data relating to registered and unregistered users of the electronic commerce system 221. Such users may also be referred to as customers or potential customers, as the case may be. The user data 245 may include a purchase history 257, browse history 260, demographic data 263, coupon history 266, eligibility data 269, advertisement history 272, and/or other data. The purchase history 257 indicates which items have been purchased by the user through the electronic commerce system 221. The browse history 260 indicates which items have been viewed, browsed, searched for, or otherwise selected by the user. In some cases, other data relating to items in shopping carts, wish lists, gift lists, etc. may be included in the user data 245. Such data may also indicate user interest in items.

The demographic data 263 may indicate age, gender, residence location, household income, and/or other demographic-related data that may be relevant for determining and selecting advertising. Such demographic data 263 may be explicitly set under the profile of the user or inferred from user interactions. The coupon history 266 indicates which digital coupons have been presented to the user, which digital coupons have been clipped and are still pending, which digital coupons have been redeemed, which digital coupons were clipped but were not redeemed, etc.

The eligibility data 269 may correspond to any data from which an advertiser may determine eligibility for a digital coupon. For example, the eligibility data 269 may indicate a click-trail through various pages in a network site has been completed by the user, where the click-trail is a prerequisite for the user to be eligible for a particular digital coupon. The advertisement history 272 may record the advertisements, and specific versions of the advertisements, which have been previously presented to the user. The user data 245 may include other data, e.g., security credentials to facilitate authentication, contact data, social networking data, and so on.

The coupon data 248 includes various data describing digital coupons. A coupon issuer can create a digital coupon campaign that is facilitated by the coupon clearinghouse system 215 by transmitting a coupon specification to the coupon clearinghouse system 215. A coupon specification can include various information regarding one or more digital coupons, such as a product identifier associated with the digital coupon as well as targeting criteria. Targeting criteria associated with a digital coupon can define requirements for users to which a digital coupon should be made available by the coupon clearinghouse system 215.

A coupon specification can also specify a promotion associated with a digital coupon, which can include a discount amount the coupon issuer is willing to reimburse to a third party retailer, a complimentary or discounted product provided is association with a particular product, and other coupon promotions as can be appreciated. A discount amount can include a fixed amount and/or a percentage of a selling price. The coupon specification can also specify a digital coupon expiration date and/or campaign budget, which describes a maximum amount a coupon issuer is willing to reimburse third party retailer sites and/or point of sale system operators in connection with a digital coupon campaign.

The coupon specification can further include retailer restrictions, which can limit those third party retailers with which a digital coupon is eligible to be redeemed. In this way, in one embodiment, a coupon issuer communicating with the coupon clearinghouse system 215 can limit a digital coupon campaign to authorized dealers of a product sold by the coupon issuer. In another embodiment, the coupon issuer can limit a digital coupon campaign to retailers that served a desired demographic.

The advertisement campaign specification data 251 outlines the parameters that control an advertising campaign initiated by an advertiser. Such an advertising campaign may include one or more digital coupons as described above. The advertisement campaign specification data 251 may include targeting criteria, eligibility criteria, budget configuration, payment instrument configuration, user interface 103 placement configuration, and/or other parameters. The advertisement campaign specification data 251 may define the conditions 118 (FIG. 1) under which a particular version of an advertisement 106 is selected for a given user. In one embodiment, such conditions 118 are defined by an advertisement selection matrix 109 having a first dimension 112 (FIG. 1) and a second dimension 115 (FIG. 1). The advertisement data 254 includes various other data relating to an advertisement campaign such as images, code, text, animations, video, audio, etc. for each of multiple versions of advertisements 106.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 275. The display 275 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application 278 and/or other applications. The client application 278 may be executed in a client 206, for example, to access network content served up by the computing environment 203 and/or other servers, thereby rendering a user interface 103 on the display 275. The client application 278 may, for example, correspond to a browser, a mobile application, etc., and the user interface 103 may correspond to a network page, a mobile application screen, etc. The client 206 may be configured to execute applications beyond the client application 278 such as, for example, browsers, mobile applications, email applications, social networking applications, and/or other applications.

Next, a general description of the operation of the various components of the networked environment 200 is provided. To begin, the electronic commerce system 221 is configured to offer various items from the item data 239 for sale through a network site. The coupon clearinghouse system 215 is configured to recognize various digital coupons configured in the coupon data 248. An advertiser interfaces with the advertisement management system 218 to create advertising campaigns involving advertising that may be served up on various network sites, including a network site corresponding to the electronic commerce system 221. In creating an advertising campaign, the advertiser may create an advertisement 106 which is included in network pages or other user interfaces 130 under certain conditions.

Further, the advertiser may provide various versions of the advertisement 106 to the advertisement management system 218. Such versions may correspond to banner ads, animations, videos, text and images, and so on. The various versions of the advertisement 106 are stored in the advertisement data 254. One or more of the versions may present a digital coupon from the coupon data 248. The digital coupon may relate to an item available for purchase through the electronic commerce system 221. The digital coupon may otherwise be clippable and redeemable through approaches supported by the coupon clearinghouse system 215. Different digital coupons may be presented in different versions of the advertisement 106. Some versions of the advertisement 106 may not mention any digital coupon and may merely promote an item.

The advertiser may delineate various parameters associated with the advertising campaign in the advertisement campaign specification data 251. In some cases, the advertiser may provide an advertisement selection matrix 109 that outlines various conditions 118 under which a particular version of the advertisement 106 is selected. The conditions 118 may involve user state and digital coupon state.

The user state may involve criteria relating to the purchase history 257, the browse history 260, the coupon history 266, the eligibility data 269, advertisement history 272, and/or other user-related data. The digital coupon state may involve criteria relating to the coupon data 248, e.g., whether the coupon is pending or upcoming, whether the coupon is active, whether the coupon has been clipped (by the user or by a threshold number of users), whether the coupon has been redeemed (by the user or by a threshold number of users), whether the coupon is expired, whether the coupon is over-budget, and/or other coupon-related states that may be managed by the coupon clearinghouse system 215.

After the advertising campaign is configured, users may request various user interfaces 130 from the electronic commerce system 221 or other network sites. The user may be recognized, identified, and/or authenticated in order to determine the user data 245 corresponding to the user. The advertisement management system 218 determines an advertisement 106 to be presented to the user at a client 206. The advertisement management system 218 then selects one of multiple versions of the advertisement 106 to be presented to the user in the user interface 103. The selected version of the advertisement 106 is encoded and sent to the client 206 as encoded advertisement data 236 within the encoded user interface data 233 and in the network data 227. It is noted that the version may be selected from multiple stored versions, or the version may be dynamically generated as may be desired.

The version may be selected according to user state and digital coupon state, where one or more versions of the advertisement 106 may present one or more digital coupons. For example, different messaging may be provided when a digital coupon is pending activation versus when the digital coupon has expired. If the digital coupon has been clipped, the messaging may exhort the user to purchase the advertised item because the coupon will expire soon. If a user is not eligible for a coupon, the advertisement 106 may omit mention of a coupon. In one embodiment, a promotional value for the digital coupon may be determined based at least in part on the user state and the digital coupon state. For example, assuming that the digital coupon is in an active state, the digital coupon may provide 10% to users who have not purchased a competing item, and 20% off to users who have purchased a competing item.

In one example, the user state includes whether the user has purchased an item corresponding to the digital coupon. One version of the advertisement 106 may be selected when the user has purchased the item, and another version of the advertisement 106 may be selected when the user has not purchased the item. In a related example, the user state includes whether the user has purchased a competing item that competes with the item corresponding to the digital coupon. One version of the advertisement 106 may be selected when the user has purchased the competing item, and another version of the advertisement 106 may be selected when the user has not purchased the competing item.

In another example, the user state or the digital coupon state includes whether the digital coupon has been clipped. One version of the advertisement 106 may be selected when the digital coupon has been clipped, and another version of the advertisement 106 may be selected when the digital coupon has not been clipped. In another example, the user state or the digital coupon state includes whether the digital coupon has expired. One version of the advertisement 106 may be selected when the digital coupon has expired, and another version of the advertisement 106 may be selected when the digital coupon has not expired. In one embodiment, a notification may be sent to the advertiser when the digital coupon is expired, over-budget, etc.

In yet another example, the digital coupon state includes whether the digital coupon has been redeemed or has a remaining non-zero quantity for redemption, e.g., where the coupon is limited to the first 100 takers, etc. One version of the advertisement 106 may be selected when the digital coupon has the remaining quantity for redemption, and another version of the advertisement 106 may be selected when the digital coupon does not have the remaining quantity for redemption or has been redeemed. For example, the other version may correspond to a different coupon for the same or a different item, or the other version may merely be an advertisement 106 without a coupon.

Figure 3:
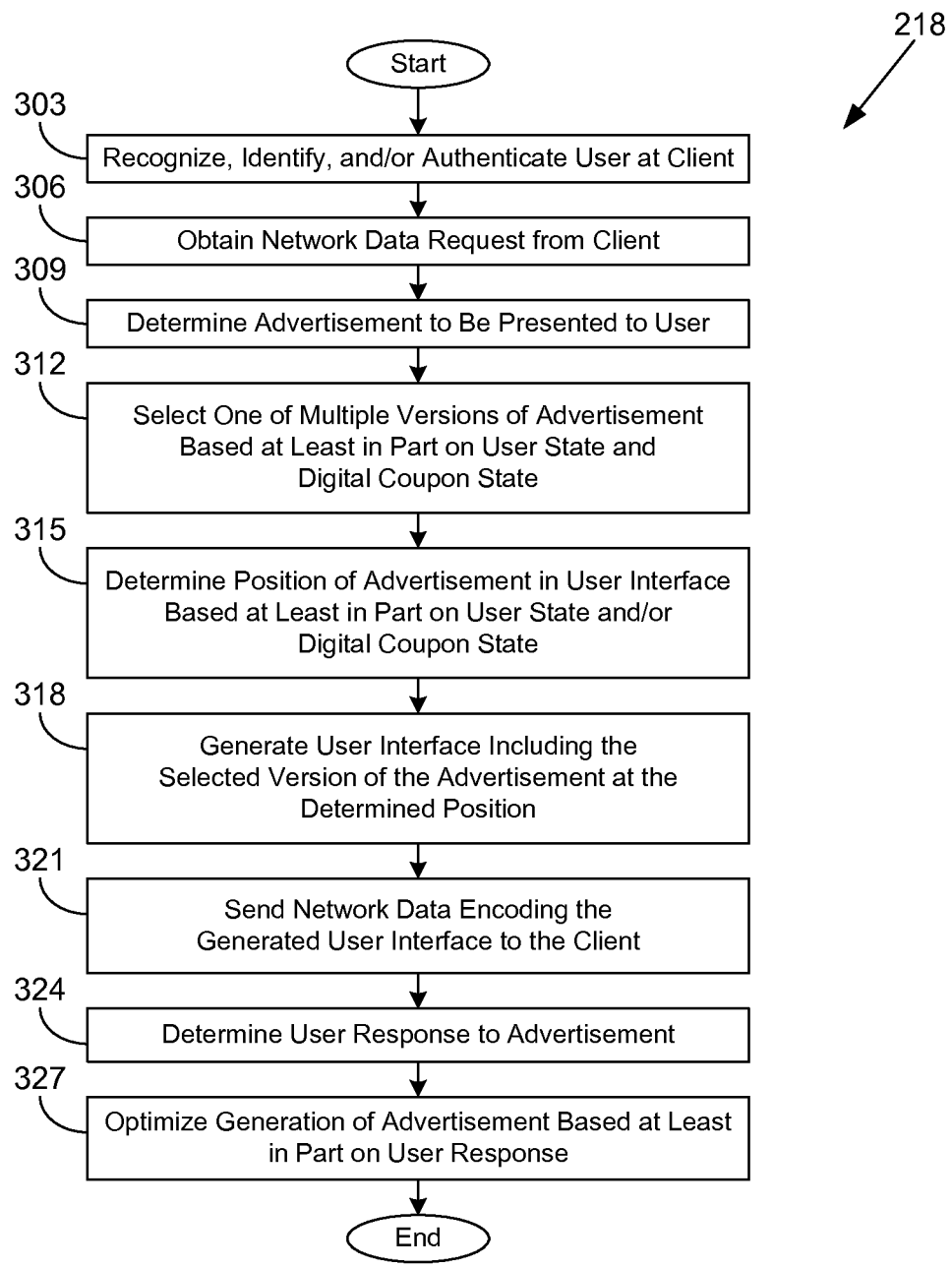
FIGS. 3 and 4 are flowcharts illustrating examples of functionality implemented as portions of an advertisement management system executed in a computing environment in the networked environment of FIG. 2 according to various embodiments of the present disclosure.

Referring next to FIG. 3, shown is a flowchart that provides one example of the operation of a portion of the advertisement management system 218 according to various embodiments. It is understood that the flowchart of FIG. 3 provides merely an example of the many different types of functional arrangements that may be employed to implement the operation of the portion of the advertisement management system 218 as described herein. As an alternative, the flowchart of FIG. 3 may be viewed as depicting an example of steps of a method implemented in the computing environment 203 (FIG. 2) according to one or more embodiments.

Beginning with box 303, the advertisement management system 218 recognizes, identifies, and/or authenticates a user or customer at a client 206 (FIG. 2). The user may be recognized, identified, and/or authenticated by way of an internet protocol (IP) address, a session identifier, a cookie identifier, a username and password combination, and/or by other approaches. In box 306, the advertisement management system 218 obtains a network data request 230 (FIG. 2) from the client 206 for a specific network page, mobile application screen, and/or other user interface 103 (FIG. 1).

In box 309, the advertisement management system 218 determines an advertisement 106 (FIG. 1) to be presented to the user. The advertisement 106 may be determined according to a link between the advertisement 106 and the requested user interface 103, targeting criteria matched by the user, a predetermined rotation, a randomized rotation, advertisements 106 previously presented to the user as recorded in the advertisement history 272 (FIG. 2), and/or other approaches. In box 312, the advertisement management system 218 generates one of multiple versions of the determined advertisement 106 based at least in part on a state associated with the user and/or a state associated with a digital coupon for an item, where the digital coupon is offered in one or more versions of the advertisement 106.

When the digital coupon is offered, the advertisement management system 218 may determine the promotional value for the digital coupon based at least in part on the state associated with the user and/or the state associated with the digital coupon. Further, the advertisement management system 218 may select a rendering of the promotional value for the digital coupon from multiple possible renderings of the promotional value for use in advertisement 106. As a non-limiting example, the advertisement management system 218 may determine whether to render a particular promotional value as a percentage or a dollar amount as a discount.

In box 315, the advertisement management system 218 may determine a position for the advertisement 106 in the user interface 103. Such a position may be determined based at least in part on a state associated with the user and/or a state associated with the digital coupon. For example, the advertisement 106 may be located at the top, left side, center, bottom, etc. of the user interface 103 depending on whether the coupon is active and on whether the user meets a desired demographic. Alternatively, the position of the advertisement 106 in the user interface 103 may be predetermined.

In box 318, the advertisement management system 218 generates the user interface 103, which includes the selected version of the advertisement 106 at the determined position. In box 321, the advertisement management system 218 sends network data 227 (FIG. 2) to the client 206 by way of the network 209 (FIG. 2). The network data 227 includes the encoded user interface data 233 (FIG. 2) and the encoded advertisement data 236 (FIG. 2).

In box 324, the advertisement management system 218 determines the user response to the advertisement 106. For example, the user may click on the advertisement 106, clip a digital coupon in the advertisement 106, initiate a purchase of the advertised item using a digital coupon in the advertisement 106, ignore the advertisement 106, and so on. In box 327, the advertisement management system 218 optimizes generation of the advertisement 106 based at least in part on the user response. For example, the advertisement 106 may be targeted or not targeted to the user or similar users in the future, the promotional value of the digital coupon may be optimized, the position of the advertisement 106 may be optimized, and so on. Thereafter, the portion of the advertisement management system 218 ends.

Figure 4:
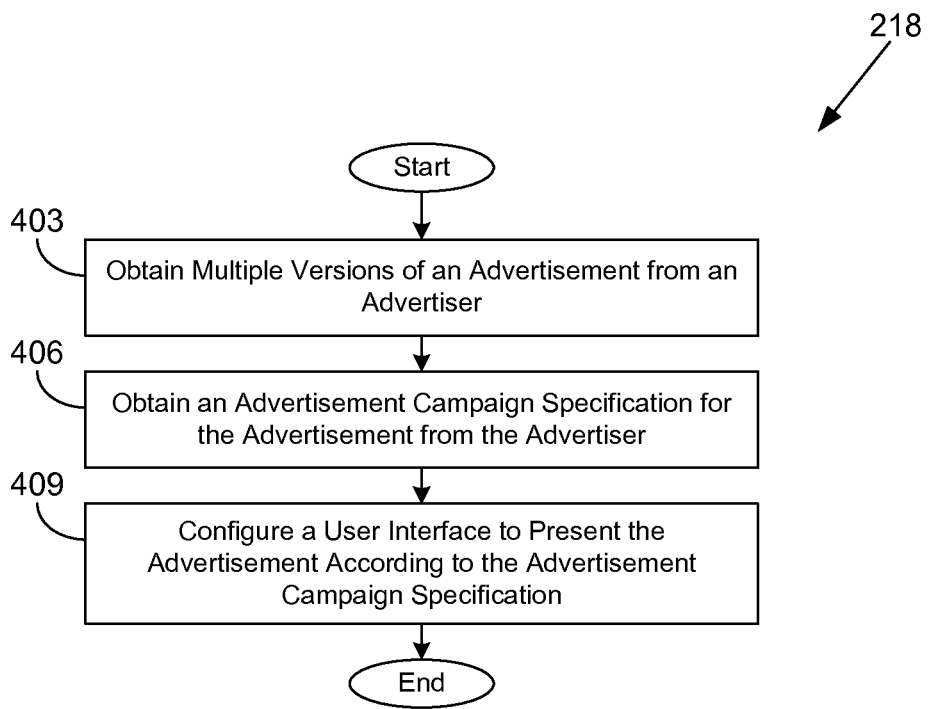

Turning now to FIG. 4, shown is a flowchart that provides one example of the operation of another portion of the advertisement management system 218 according to various embodiments. It is understood that the flowchart of FIG. 4 provides merely an example of the many different types of functional arrangements that may be employed to implement the operation of the portion of the advertisement management system 218 as described herein. As an alternative, the flowchart of FIG. 4 may be viewed as depicting an example of steps of a method implemented in the computing environment 203 (FIG. 2) according to one or more embodiments.

Beginning with box 403, the advertisement management system 218 obtains multiple versions of an advertisement 106 (FIG. 1) from an advertiser. One or more of the versions may include a digital coupon offer. In some cases, one or more of the versions may not include the digital coupon offer. In box 406, the advertisement management system 218 obtains an advertisement campaign specification for the advertisement 106 from the advertiser. The advertisement campaign specification is recorded in the advertisement campaign specification data 251 (FIG. 2).

In one embodiment, the advertisement campaign specification comprises an advertisement selection matrix 109 (FIG. 1) that specifies various conditions 118 (FIG. 1) with respect to user state and digital coupon state. In one example, the advertisement selection matrix 109 may have a first dimension 112 (FIG. 1) corresponding to multiple possible values for the user state parameter and a second dimension 115 (FIG. 1) corresponding to multiple possible values for the digital coupon state parameter. In box 409, the advertisement management system 218 configures user interface data 242 (FIG. 2) to present the advertisement 106 in a user interface 103 (FIG. 1) according to the advertisement campaign specification. Thereafter, the portion of the advertisement management system 218 ends.

Figure 5:
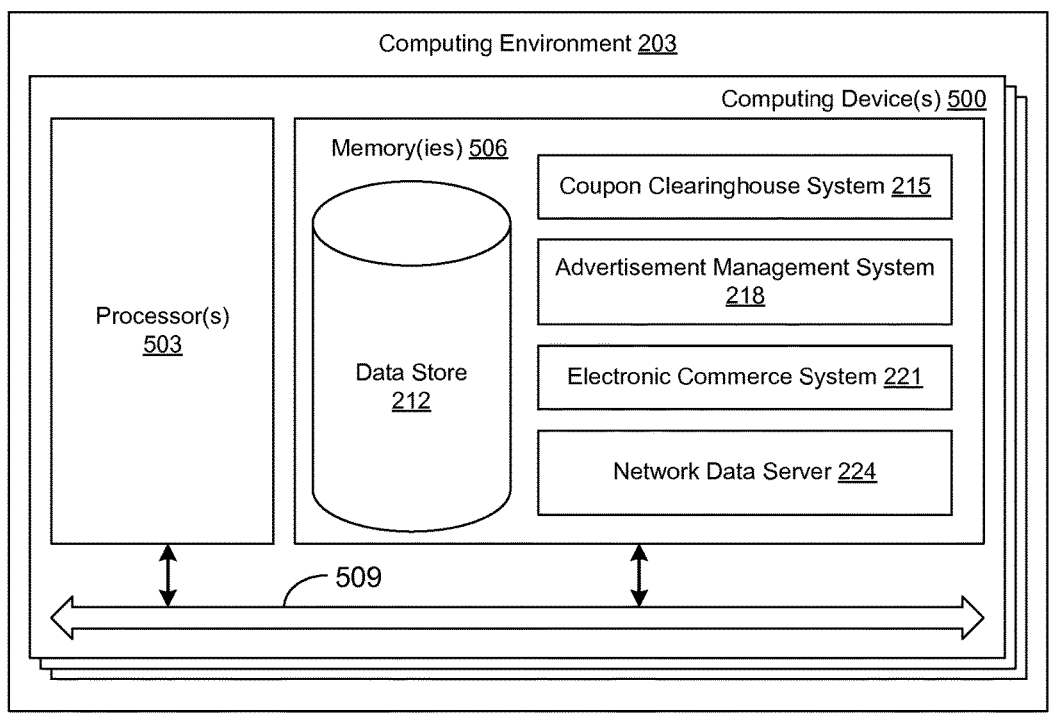
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the coupon clearinghouse system 215, the advertisement management system 218, the electronic commerce system 221, the network data server 224, and potentially other applications. Also stored in the memory 506 may be a data store 212 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the coupon clearinghouse system 215, the advertisement management system 218, the electronic commerce system 221, the network data server 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 the functionality and operation of an implementation of portions of the advertisement management system 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the coupon clearinghouse system 215, the advertisement management system 218, the electronic commerce system 221, and the network data server 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program that, when executed by at least one computing device, causes the at least one computing device to at least:
   authenticate a user account associated with a client based at least in part on a security credential corresponding to the user account;
   obtain a request for a user interface from the client;
   determine an advertisement corresponding to an item to be presented on the client;
   generate a first version of the advertisement and a second version of the advertisement based at least in part on a state associated with the user account and a state associated with a digital coupon for the item, the first version presenting the digital coupon and the second version excluding the digital coupon;
   determine a position in the user interface for one of the first version or the second version of the advertisement based at least in part on the state associated with the user account and the state associated with the digital coupon;
   generate the user interface, including the one of the first version or the second version of the advertisement at the position in the user interface; and
   send data encoding the user interface to the client.

2. The non-transitory computer-readable medium of claim 1, wherein the state associated with the user account indicates at least one of: whether a customer associated with the user account has purchased the item, whether the customer has purchased a competing item, or demographic data associated with the customer.

3. The non-transitory computer-readable medium of claim 1, wherein the state associated with the digital coupon indicates at least one of: whether the digital coupon is pending activation, whether the digital coupon is active, whether the digital coupon has expired, or whether the digital coupon is over budget.

4. The non-transitory computer-readable medium of claim 1, wherein the program further causes the at least one computing device to at least:
   determine whether a different coupon exists corresponding to the item; and
   present the different coupon in the second version of the advertisement.

5. A system, comprising:
   a data store including a plurality of states individually associated with a plurality of user accounts and a state associated with a digital coupon for an item; and
   at least one computing device communicably coupled to the data store, the at least one computing device configured to at least:
      authenticate a user associated with a client based at least in part on a security credential, the user being associated with one of the plurality of user accounts;
      determine an advertisement to be presented to the user;
      generate one of a plurality of versions of the advertisement based at least in part on the state associated with the digital coupon for the item and a state associated with the user, at least one of the versions presenting the digital coupon;
      generate a user interface including one of the versions of the advertisement that has been selected at a position, the position being based at least in part on the state associated with the user account and the state associated with the digital coupon; and
      send data encoding the user interface including the one of the versions of the advertisement that has been selected to a client associated with the user.

6. The system of claim 5, wherein the one of the versions of the advertisement includes a component for initiating a purchase of the item using the digital coupon, and the at least one computing device is further configured to:
   obtain a request from the client to initiate the purchase of the item using the digital coupon;
   determine a promotional value for the digital coupon; and
   initiate the purchase of the item by the user, in response to the request, with the promotional value for the digital coupon being applied to the purchase.

7. The system of claim 5, wherein the one of the versions of the advertisement includes a component for clipping the digital coupon, and the at least one computing device is further configured to:
   obtain a request from the client to clip the digital coupon; and
   associate the user with the digital coupon in response to the request.

8. The system of claim 5, wherein the at least one computing device is further configured to select the one of the versions of the advertisement from a plurality of stored versions of the advertisement.

9. The system of claim 5, wherein the one of the versions of the advertisements is dynamically generated.

10. The system of claim 5, wherein at least another one of the versions excludes the digital coupon.

11. The system of claim 5, wherein the at least one computing device is further configured to select the one of the versions according to an advertisement selection matrix, a first dimension of the advertisement selection matrix corresponds to a plurality of possible states for the user, and a second dimension of the advertisement selection matrix corresponds to a plurality of possible states for the digital coupon.

12. The system of claim 5, wherein the at least one computing device is further configured to determine a promotional value for the digital coupon based at least in part on the state associated with the user, the state associated with the digital coupon, or both.

13. The system of claim 12, wherein the at least one computing device is further configured to select one of a plurality of renderings of the promotional value to be presented in the one of the versions of the advertisement.

14. The system of claim 5, wherein the at least one computing device is further configured to optimize generation of the advertisement based at least in part on a response of the user to the one of the versions of the advertisement.

15. The system of claim 5, wherein the at least one computing device is further configured to generate the one of the versions of the advertisement based at least in part on a state associated with the user account.

16. The system of claim 15, wherein the at least one computing device is further configured to:
determine whether the user has purchased the item from an electronic commerce system based at least in part on purchase history data in the data store;
generate a first one of the versions in response to determining that the user has purchased the item; and
generate a second one of the versions in response to determining that the user has not purchased the item.

17. The system of claim 15, wherein the at least one computing device is further configured to:
determine whether the user has purchased a competing item from an electronic commerce system based at least in part on purchase history data in the data store;
generate a first one of the versions in response to determining that the user has purchased the competing item; and
generate a second one of the versions in response to determining that the user has not purchased the competing item.

18. The system of claim 15, wherein the at least one computing device is further configured to determine that the digital coupon is of interest to the user based at least in part on demographic data stored in the data store.

19. The system of claim 15, wherein the at least one computing device is further configured to determine that the digital coupon is of interest to the user based at least in part on purchase history data corresponding to the user, the purchase history data being stored in the data store associated with the one of the plurality of user accounts associated with the user.

20. The system of claim 19, wherein the state associated with the user account is based at least in part on the purchase history data being stored in the data store.

21. The system of claim 15, wherein the at least one computing device is further configured to:
determine whether the user is eligible for the digital coupon;
generate a first one of the versions that presents the digital coupon in response to determining that the user is eligible for the digital coupon; and
generate a second one of the versions that promotes the item but does not mention the digital coupon in response to determining that the user is not eligible for the digital coupon.

22. The system of claim 5, wherein the digital coupon comprises a first digital coupon, and the at least one computing device is further configured to:
determine whether the first digital coupon has expired;
generate a first one of the versions that presents the first digital coupon in response to determining that the first digital coupon has not expired; and
generate a second one of the versions that does not mention the first digital coupon and presents a second digital coupon in response to determining that the digital coupon has expired.

23. The system of claim 5, wherein the at least one computing device is further configured to:
determine whether a non-zero quantity of the digital coupon remains for redemption;
generate a first one of the versions that presents the digital coupon in response to determining that the digital coupon has the non-zero quantity remaining for redemption; and
generate a second one of the versions that does not mention the digital coupon in response to determining that the digital coupon does not have the non-zero quantity remaining for redemption.

24. The system of claim 23, wherein the digital coupon comprises a first digital coupon, and the second one of the versions comprises a second digital coupon associated with a different item.

25. A method, comprising:
obtaining, in at least one computing device, a plurality of versions of an advertisement from an advertiser;
obtaining, in the at least one computing device, an advertisement campaign specification for the advertisement from the advertiser, the advertisement campaign specification indicating a respective condition under which each respective one of the versions is generated for presentation, each respective condition being based at least in part on a digital coupon state parameter and a customer state parameter;
authenticating, in the at least one computing device, a customer associated with a client based at least in part on a security credential corresponding to a user account; and
configuring, in the at least one computing device, a user interface to present the advertisement to the customer associated with the client according to the advertisement campaign specification, wherein a position in the user interface to present the advertisement is based at least in part on the digital coupon state parameter and the customer state parameter.

26. The method of claim 25, further comprising:
obtaining, in the at least one computing device, a request for the user interface from the client;
generating, in the at least one computing device, one of the versions of the advertisement according to the advertisement campaign specification, a state associated with a digital coupon for an item, and a state associated with the customer; and
sending, in the at least one computing device, data encoding the user interface to the client, the user interface being configured to present the one of the versions of the advertisement that has been selected.

27. The method of claim 25, wherein the advertisement campaign specification includes an advertisement selection matrix having a first dimension corresponding to a plurality of possible values for the digital coupon state parameter and a second dimension corresponding to a plurality of possible values for a customer state parameter, each respective condition being an intersection of the first dimension and the second dimension.

28. The method of claim 25, wherein the advertisement campaign specification associates at least one of the versions of the advertisement with a digital coupon for an item, the digital coupon state parameter indicates a state corresponding to the digital coupon, and the customer state parameter indicates a state corresponding to the customer.

29. The method of claim 28, wherein the state associated with the digital coupon is selected from the group consisting of: a pending state, an active state, a clipped state, a redeemed state, an expired state, and an over-budget state.

* * * * *